United States Patent [19]
Goto et al.

[11] Patent Number: 6,124,394
[45] Date of Patent: *Sep. 26, 2000

[54] FIRE-RETARDANT TABLET, AND FIRE-RETARDING METHOD, FIRE-RETARDANT POLYMER COMPOSITION AND MOLDED ARTICLE EMPLOYING THE SAME

[75] Inventors: Mikio Goto; Yasumi Tanaka, both of Mie; Kenji Koyama, Yamaguchi, all of Japan

[73] Assignee: Tosoh Corporation, Yamaguchi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/909,935

[22] Filed: Aug. 12, 1997

[30] Foreign Application Priority Data

Aug. 13, 1996 [JP] Japan .................................. 8-213479

[51] Int. Cl.⁷ ..................................................... C08K 3/04
[52] U.S. Cl. ........................... 524/495; 523/179; 252/601; 252/609; 428/408
[58] Field of Search ........................... 524/495; 523/179; 252/609, 601; 428/408

[56] References Cited

U.S. PATENT DOCUMENTS

| | | | |
|---|---|---|---|
| 4,694,030 | 9/1987 | Bonin et al. ............................ | 523/179 |
| 5,094,780 | 3/1992 | von Bonin ............................... | 428/408 |
| 5,262,470 | 11/1993 | Shimotsuma et al. ................... | 524/496 |
| 5,382,387 | 1/1995 | Bonin et al. ............................. | 524/179 |
| 5,432,225 | 7/1995 | Nakamura et al. ...................... | 524/495 |
| 5,760,115 | 6/1998 | Okisaki et al. .......................... | 524/495 |
| 5,810,914 | 9/1998 | Okisaki et al. .......................... | 428/921 |
| 5,846,656 | 12/1998 | Dunski ..................................... | 524/291 |
| 5,981,072 | 11/1999 | Mercuri et al. .......................... | 428/408 |
| 6,033,600 | 3/2000 | Henkins et al. ..................... | 215/400.24 |

FOREIGN PATENT DOCUMENTS

| | | | |
|---|---|---|---|
| 6-025485 | 2/1994 | Japan . | |
| 8-113671 | 5/1996 | Japan . | |
| 2 226 033 | 6/1990 | United Kingdom ............. | C08K 3/00 |

OTHER PUBLICATIONS

Database WPI, Section Ch, Week 9628, Derwent Publications Ltd., London, GB; Class A18, AN 96–272820 XP002047172.

Database WPI, Section Ch, Week 9409, Derwent Publications Ltd., London, GB; Class A17, AN 94–072063 XP002047173.

*Primary Examiner*—Veronica P. Hoke
*Attorney, Agent, or Firm*—Sughrue, Mion, Zinn, Macpeak & Seas, PLLC

[57] ABSTRACT

Fire retardant tablet is provided which is produced by tableting a fire retardant mixture containing heat-expandable graphite (A), and a water-soluble fire retardant synergist (B) or one containing additionally water-insoluble fire-retardant synergist (C). A method for fire retardation, a fire-retardant polymer composition, and a molded article of a fire-retardant resin by use of the fire retardant tablet are also provided. In the production of a fire retarding polymer composition containing heat-expandable graphite, the crushing of the heat-expandable graphite under melt-shearing is minimized.

25 Claims, No Drawings

FIRE-RETARDANT TABLET, AND FIRE-RETARDING METHOD, FIRE-RETARDANT POLYMER COMPOSITION AND MOLDED ARTICLE EMPLOYING THE SAME

BACKGROUND OF THE INVENTION

1. Field of the Invention

The present invention relates to a fire retardant tablet produced by tableting a mixture containing a fire retardant as the essential component, a method of fire retardation of a resin employing the tableted fire retardant, and a fire-retardant polymer composition comprising the fire-retardant resin. In particular, the present invention relates to a fire-retardant polymer composition having excellent fire retardancy, and a molded article therefrom.

2. Description of the Related Art

Heat-expandable graphite is known to exhibit excellent fire retardancy in combination with one or more of fire retardant auxiliaries including phosphorus compounds such as red phosphorus and ammonium polyphosphate; metal oxides such as antimony trioxide and zinc borate; and metal hydroxides such as aluminum hydroxide and magnesium hydroxide.

The fire-retardant polymer compositions, which contain the heat-expandable graphite and have excellent fire retardancy, are usually produced by mixing a resin with heat-expandable graphite and the above fire retardant synergist; mixing and kneading in a kneading machine such as a single screw extruder or a twin screw extruder to produce a fire retardant compound or a fire retardant master batch; and then molding the fire retardant compound by a molding machine such as an injection machine, or mixing the fire retardant master batch with a resin and molding the mixture by a molding machine such as an injection machine.

The fire retardant master batch produced by melt-blending and containing the heat-expandable graphite is limited in the maximum fire retardant concentration to be about 50%, and the content of the resin component (hereinafter referred to as a "binder") is higher. Therefore, the binder affects significantly the mechanical properties of a molded article produced from a resin and the master batch. This disadvantageously necessitates production of master batches for respective kinds of resins.

The heat-expandable graphite, in blending with the resin in production of the fire retardant compound or master batch, comes to be crushed by melt-shearing into smaller size particles, resulting in lower fire retardancy.

To prevent the crushing of the heat-expandable graphite in the blending with the resin in production of the fire-retardant polymer composition, the kneading is conducted at an extremely low shearing rate with a single screw extruder, or the blending is conducted with a twin screw extruder by feeding the heat expandable graphite to a side-feeder of the extruder. However, the former method does not give high productivity and does not give sufficient fire retardancy owing to poor dispersion of the heat-expandable graphite. The latter method prevents the crushing of the heat-expandable graphite to some extent, but not sufficiently.

JP-A-6-25476, JP-A-6-25485, JP-A-6-73251, and so forth disclose methods of achieving the higher fire retardancy by using the heat-expandable graphite having an expansion property in the c-axis direction in rapid heating, and a limited particle size on a 80 mesh sieve. These methods, however, cannot compensate for the decrease of the fire retardancy caused by crushing of the heat-expandable graphite in kneading with the resin.

The present invention is made to solve the above problems.

SUMMARY OF THE INVENTION

The present invention intends to provide a fire retardant tablet which contains fire retardant heat-expandable graphite and is capable of minimizing crushing of heat-expandable graphite under melt-shearing conditions in production of a fire-retardant polymer composition containing the heat-expandable graphite as a fire retardant.

The present invention intends also to provide a method for fire retardation, and a fire-retardant polymer composition employing the tableted fire retardant, and a molded article produced from the fire-retardant polymer composition.

It was found by the inventors of the present invention that the crushing of the heat-expandable graphite by melt-shearing in production of a polymer composition containing the heat-expandable graphite is minimized by tableting a fire retardant mixture containing heat-expandable graphite and a water-soluble fire retardant synergist, or containing heat-expandable graphite, a water-soluble fire retardant synergist, and a water-insoluble fire retardant synergist; and blending the resulting fire retardant tablets into a resin. The present invention has been is completed on the basis of the above findings.

The tableted fire retardant of the present invention is produced by tableting a fire retardant mixture containing heat-expandable graphite (A), and water-soluble fire retardant synergist (B); or a fire retardant mixture containing heat-expandable graphite (A), water-soluble fire retardant synergist (B), and water-insoluble fire retardant synergist (C).

The method of fire retardation and the fire-retardant polymer composition of the present invention comprises blending 5 to 60 parts by weight of the above fire retardant tablet with 100 parts by weight of a resin.

The fire-retardant polymer composition of the present invention is a blend of 5 to 60 parts by weight of the above fire retardant tablet with 100 parts by weight of a resin.

The fire retardant molded article of the present invention is produced by molding the above fire-retardant polymer composition.

DETAILED DESCRIPTION OF THE PREFERRED EMBODIMENT

In the present invention, the tableted fire retardant is a particulate matter having a certain particle size and a certain particle shape and being composed of powdery heat-expandable graphite (A) and water-soluble fire retardant synergist (B), or powdery heat-expandable graphite (A), water-soluble fire retardant synergist (B) and a water-insoluble fire retardant synergist (C). The shape of the fire retardant tablet is not especially limited, and includes the shapes of a sphere, cylinder, prism, and plate. The size of the fire retardant tablet is preferably in the range of from about 0.1 to about 10 mm in average particle diameter, and is preferably nearly the same size as the resin pellets employed. The average diameter in the present invention means the average of the diameters when the tablets are spherical, the average of the lengths when the tablets are cylindrical or prismatic, the average of the major diameters when the tablets are plate-like, and the average of the major diameters when the tablets are in other shapes.

The component (A) of the present invention is heat-expandable graphite. The heat-expandable graphite is derived from natural graphite or artificial graphite. It expands in the c-axis direction (perpendicular to the cleavage direction of graphite) when it is rapidly heated from room temperature to 800–1000° C.

The heat-expandable graphite in the present invention preferably has expandability, namely the difference between the specific volume (mL/g) after heating to 800–1000° C. and the specific volume at room temperature, of not less than 100 mL/g in view of the fire retarding effect. The heat-expandable graphite having the expandability of less than 100 mL/g exhibits much lower fire retardancy than that having the expandability of more than 100 mL/g. The expandability, namely the difference between the specific volume (mL/g) after heating to 800–1000° C. and the specific volume at room temperature, is measured specifically as below in the present invention. A quartz beaker is heated preliminarily to 1000° C. in an electric furnace. Into the heated quartz beaker, 2 g of heat-expandable graphite is introduced, and the quartz beaker is placed immediately in the electric furnace for 10 seconds. The weight of 100 mL of the expanded graphite is measured to obtain the expanded apparent specific density (g/mL).

(Specific volume)=1/(Expanded apparent specific gravity)

Separately the specific volume of the heat-expandable graphite before the heating is obtained in the same manner, and the expandability of the heat-expandable graphite is derived.

(Expandability)=(specific volume after heating)−(Specific volume at room temperature)

The heat-expandable graphite can be prepared by oxidation treatment of scaly graphite. The oxidation method is not limited and includes electrolytic oxidation in hydrogen peroxide/sulfuric acid, and oxidation treatment with a mixed acid such as phosphoric acid-nitric acid, sulfuric acid-nitric acid, and sulfuric acid-perchloric acid.

The component (B) is a water-soluble fire retardant synergist which is synergistic to the heat-expandable graphite component (A) in fire retardancy, and has a solubility in water of not lower than 0.5 mg/100 g. The fire retardant synergist of a water solubility of less than 0.5 mg/100 g lowers the mechanical strength of the resulting tablets, and is not suitable for the tablet formation.

The water-soluble fire retardant synergist includes water-soluble phosphorus compounds, metal oxides, metal hydroxides, and mixtures of two or more thereof, but is not limited thereto. Incidentally, the metal oxide includes compound metal oxides in the present invention.

The water-soluble phosphorus compounds as the component (B) of the present invention is not especially limited provided that it is synergistic to the heat-expandable graphite component (A). The water-soluble phosphorus compounds include derivatives of oxo-acids of phosphorus (hereinafter referred to as "phosphoric acids") such as phosphate salts, phosphate ester salts, phosphate ester, condensed phosphate salts, nitrogen-containing phosphorus derivatives, phosphonic acid derivatives, phosphinic acid derivatives, phosphorous acid derivatives, hypophosphorous acid derivatives, phosphonates, phosphinates, phosphine oxides, phosphites, phosphonites, phosphinites, and phosphines. Specific example thereof are addition reaction products of dimethyl methylphosphonate, ethylene oxide and phosphorus pentaoxide, ammonium polyphosphate, melamine-modified ammonium polyphosphate, polymelamine phosphate, and melamine phosphate. Of these, ammonium polyphosphate is the most suitable (solubility in water: 1 mg/100 g at 18° C.).

The water-soluble metal oxide as the component (B) of the present invention is not especially limited provided that it is synergistic to the heat-expandable graphite, component (A). The suitable water-soluble metal oxide includes oxides of metals selected from antimony, bismuth, zirconium, molybdenum, tungsten, boron, aluminum, magnesium, and zinc, combinations of two or more thereof, and compounds thereof. Specific examples are magnesium oxide, boron oxides, molybdenum trioxide, alkali borates, and alkali molybdates. Of these, magnesium oxide is the most suitable (solubility in water: 0.62 mg/100 g at 18° C.).

The water-soluble metal hydroxide as the component (B) of the present invention is not especially limited provided that it is synergistic to the heat-expandable graphite component (A). The specific examples thereof are magnesium hydroxide, barium hydroxide, calcium hydroxide, strontium hydroxide, and zinc hydroxide, and combinations of two or more thereof. Of these, magnesium hydroxide is the most suitable (solubility in water: 0.9 mg/100 g at 18° C.).

The water-soluble fire retardant synergist, component (B), of the present invention, is not only synergistic to the heat-expandable graphite component (A) as the fire retardant, but also serves as the binder in tableting the fire retardant mixture. The amount of incorporation of the component (B) is not less than one part by weight to 100 parts by weight of the heat-expandable graphite component (A). With the component (B) of less than one part by weight, the effect as the binder is low in granulating the fire retardant tablet, and the tablet formation may be unsuccessful.

A water-insoluble fire retardant synergist may be used additionally as the component (C) in the present invention.

The component (C) is a water-insoluble fire retardant synergist which is synergistic to the heat-expandable graphite in fire retardancy, and has a solubility in water of lower than 0.5 mg/100 g.

The water-insoluble fire retardant synergist is not especially limited, and is exemplified by red phosphorus, water-insoluble compounds including phosphorus compounds, metal oxides, and metal hydroxides, and combinations of two or more thereof. The metal oxides includes compound metal oxides in the present invention.

The water-insoluble phosphorus compound as the component (C) in the present invention is not especially limited provided that it is synergistic to the heat-expandable graphite component (A). The suitable examples of the phosphorus compound are shown by formulas (1)–(4) below:

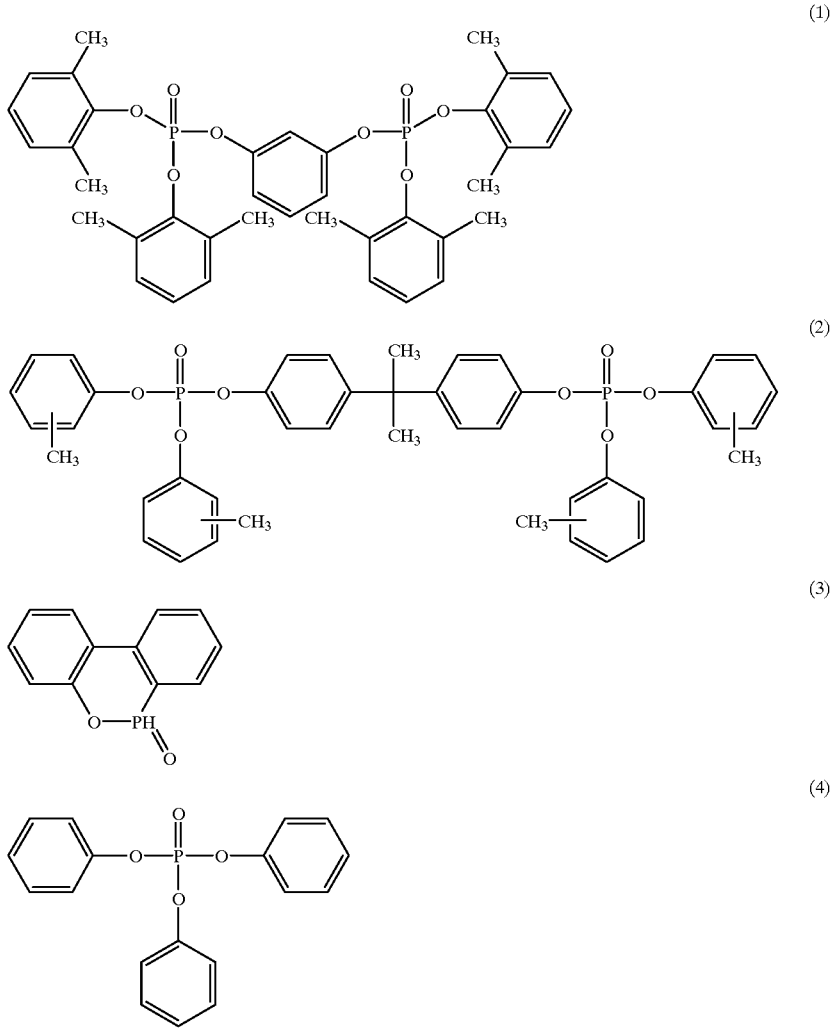

The water-insoluble metal oxide as the component (C) in the present invention is not especially limited provided that it is synergistic to the heat-expandable graphite component (A). The suitable examples of the metal oxide include oxides and compound oxides of metals of antimony, bismuth, zirconium, molybdenum, tungsten, boron, aluminum, magnesium and zinc, and combinations of two or more thereof. The specific examples are antimony trioxide, aluminum oxide, dibismuth trioxide, zinc borate, sodium antimonate and zinc molybdate. Of these, the most suitable are antimony trioxide (solubility in water: 0.16 mg/100 g at 18° C.), and zinc borate.

The water-insoluble metal hydroxide as the component (C) in the present invention is not especially limited provided that it is synergistic to the heat-expandable graphite component (A). A suitable example thereof is aluminum hydroxide (solubility in water: 0.104 mg/100 g at 18° C.).

The ratio of the water-soluble fire retardant synergist component (B) to the water-insoluble fire retardant synergist component (C) is preferably not less than 1/99 by weight in the present invention:

Component (B)/Component (C)≧1/99 (by weight)

At a lower weight ratio of the water-soluble fire retardant synergist, the binder effect is lower to result in lower mechanical strength of the tablets, and disintegration of the tablets may be caused in storage, transportation, or mixing with the resin.

The fire retardant mixture containing heat-expandable graphite (A) and a water-soluble fire retardant synergist (B), or the one containing additionally a water-insoluble fire retardant synergist (C) is granulated and tableted by a granulating machine. The granulating machine is not especially limited, and includes tumbling granulation machines the of rotating dish type, rotating cylinder type, and rotating truncated cone type; fluidized layer granulation machines of the normal fluidized layer type, modified fluidized layer type, and jet flow layer type; stirring granulation machines of the pug mill type, Henschel type, and Eirich type; disintegrating granulation machines of the rotating knife type, and rotating bar type; compression granulating machines of the compression roll type, bricketting roll type, and tableting type; extruding granulation machines of the screw type, rotating multi-hole dice type, and rotating blade type. Of these, preferred are tumbling granulation machines, fluidized layer granulation machines, extruding granulation machines, and compressing granulation machines, employing water as the binder. The extrusion granulating machines are more preferred since this type of machine is capable of producing tablets having a uniform shape, a uniform size, and a high strength at a high productivity.

The fire retarding method and the fire-retardant polymer composition of the present invention are described below.

In the present invention, a fire retardant mixture containing heat-expandable graphite (A), and a water-soluble fire retardant synergist (B), or containing heat-expandable graphite (A), a water-soluble fire retardant synergist (B), and a water-insoluble fire retardant synergist (C) is granulated and tableted, and 5 to 60 parts by weight of the tableted fire retardant is added to 100 part by weight of the resin. With the amount of the tableted fire-retardant of less than 5% by weight, the fire retardation is not sufficient. With the amount thereof of more than 60% by weight, the mechanical strength of composition drops significantly and the fire retardation effect is saturated, which is economically disadvantageous.

The water-soluble fire retardant synergist component (B) or the water-insoluble fire retardant synergist component (C), in the present invention, may be surface-treated within such an extent that the effect as the fire retardant synergist and water-solubility are not impaired. The surface treatment can be conducted with a thermosetting resin such as phenol resins, and melamine resins, or a hydroxide or an oxide of magnesium, aluminum, or the like.

The resin used in the present invention may be either a thermoplastic resin or a thermosetting resin. The thermoplastic resin includes specifically olefin resins such as polyethylene, polypropylene, ethylene-propylene copolymer resins, and ethylene-acrylate ester copolymer resins; styrenic resins such as polystyrene, acrylonitrile-styrene copolymer resins, and acrylonitrile-butadiene-styrene copolymer resins; vinyl resins such as vinyl chloride, polymethyl methacrylate, and ethylene-vinyl acetate copolymer resins; amide resins such as 6-nylon, and 66-nylon; ester resins such as polyethylene terephthalate, and polybutylene terephthalate; and carbonate resins such as polycarbonate. The thermoplastic resin may be a mixture, a copolymer, or a modified polymer thereof. The thermosetting resin includes specifically rubber elastic polymers such as styrene-butadiene rubbers, acrylonitrile-butadiene rubbers, and chloroprene rubbers; phenol resins; unsaturated polyester resins; epoxy resins; polysiloxane resins such as silicone elastomers and room-temperature curing type silicone rubbers; and polyurethane resins.

The mixing machine for mixing the tableted fire retardant with the resin includes tumblers, Henschel mixers, and ribbon mixers, but is not limited thereto in the present invention.

The molding of the fire-retardant polymer composition composed of the tableted fire retardant and a resin can be conducted by direct molding of the pellets by a molding machine such as an injection molding machine and an extrusion molding machine (sheet molding, blow molding, etc,), or can be conducted by melt blending by a low-shear extruder, but is not limited thereto.

A further additional fire retardant may be incorporated in such an amount that the effect of the present invention is not impaired. Further, an additive such as an inorganic filler, a colorant, and antioxidant may be incorporated, as necessary.

The tableted fire retardant and the fire-retardant polymer composition of the present invention have excellent fire retardancy because crushing of the heat-expandable graphite is prevented in production of the fire-retardant polymer composition and a molded article thereof, so that the amount of incorporation of the heat-expandable graphite can be reduced economically because little crushing occurs.

The effects of the present invention are described specifically by reference to examples without limiting the present invention.

The materials below are used in the examples and the comparative examples.

(A) Heat-Expandable Graphite:

(A-1): Heat-expandable graphite A (produced by Chuou Kasei K. K., the difference between specific volume (mL/g) after heating to 1000° C. and the specific volume at room temperature: 180 mL/g)

(A-2): Heat-expandable graphite B (produced by Chuou Kasei K. K., the difference between specific volume (mL/g) after heating to 1000° C. and the specific volume at room temperature: 200 mL/g)

(B) Water-Soluble Fire Retardant Auxiliaries:

(B1): Ammonium polyphosphate (HOSTAFLAM AP462, Hoechst Co.)

(B2): Adduct formed from dimethyl methylphosphonate, ethylene oxide, and phosphorus pentaoxide, (FYROL 51, Akzo-Kashima K. K., hereinafter referred to as "Phosphorus compound A")

(B3): Magnesium oxide (Kyowa Mag 150, Kyowa Kagaku Kogyo K. K.)

(B4): Magnesium hydroxide (Magnesium Hydroxide 200, Konoshima Kagaku Kogyo K. K.)

(C) Water-Insoluble Fire Retardant Auxiliaries:

(C1): Antimony trioxide (Flame Cut 610R, Tosoh Corporation)

(C2): Zinc borate (Zinc Borate 2335, Tomita Seiyaku K. K.)

(C3): Red phosphorus (Flame Cut Novared 120, Tosoh Corporation)

(C4): Cresol condensation type phosphoric acid ester of the aforementioned Formula (1) (PX-200, Daihachi Kagaku Kogyo, hereinafter referred to as "Phosphorus Compound B").

(C5): Phosphate ester of the aforementioned Formula (2) having a bisphenol A skeleton (Phosflex 580, Akzo-Kashima K. K., hereinafter referred to as "Phosphorus Compound C")

(C6): 9,10-dihydro-9-oxa-10-phosphanusphenanthrene-10-oxide (HIRETAR 101, Kohlon Co., hereinafter referred to as "Phosphorus Compound D")

(C7): Triphenyl phosphate (Phosflex TPP, Akuzo-Kashima K. K., hereinafter referred to as "Phosphorus Compound E")

(D) Resins:

(D1): Polypropylene (Chisso Polypro K7014, Chisso Corporation)

(D2): Ethylene-vinyl acetate copolymer (Ultrathene 630, Tosoh Corporation)

(D3): Low-density polyethylene (Petrothene 203, Tosoh Corporation)

The testing method employed in the examples and the comparative examples are as shown below.

[Strength of Fire Retardant Tablet]

The tableted fire retardant was shaken on a 10-mesh sieve for 20 minutes by a shaking machine. The amount of the tablet crushed and passing through the sieve is measured (% by weight), and is rated as below:

Good: Crushed tablet ratio being lower than 10%

Fair: Crushed tablet ratio being within the range of from 10 to 20% by weight

Poor: Crushed tablet ratio being higher than 20% by weight

[UL-94 Vertical Burning Test]

The combustibility was tested with five ⅛-inch thick test pieces and five 1/16-inch thick test pieces according to Vertical Combustion Test Method of Subject 94 of Underwriter's Laboratories.

9

[Particle Size of Heat-Expandable Graphite in Molded Article]

A test piece molded by injection molding is treated with hot xylene to dissolve the resin, and undissolved heat-expandable graphite is collected by filtration through a filter constituted of five 300-mesh stainless steel screens. The particle size of the heat-expandable graphite is represented by the ratio of the particles retained on a 80-mesh sieve.

EXAMPLE 1

100 Parts by weight of the heat-expandable graphite A (A1) was mixed with 10 parts by weight of ammonium polyphosphate (B1). Thereto, 15% by weight of water was added on the basis of the total weight of the powder mixture. The resulting fire retardant mixture was granulated by a granulating machine (trade name: Disk Pelleter, Fuji Paudaru K. K.) and dried to obtain cylindrical tablets of 3 mm diameter and 4 mm long.

By a tumbler, 40 parts by weight of the above tableted fire retardant was mixed with 100 parts by weight of polypropylene (D1). The mixture was injection-molded at the nozzle temperature of 200° C., and the cylinder temperature of 200° C. into test pieces of ⅛ inch thick for the UL94 vertical burning test.

The resulting test pieces were tested for the flammability, the particle size of the heat-expandable graphite in the molded test piece, and the strength of the fire retardant tablet according to the above testing methods. The test results are shown in Table 1.

The obtained fire retardant tablets had sufficient strength, and excellent fire-retardancy was achieved without causing crushing of the heat-expandable graphite as shown in Table 1.

EXAMPLES 2–5

The heat-expandable graphite A (A1) and the ammonium polyphosphate (B1) were mixed in the fire retardant composition ratio as shown in Table 1, and the mixture was tableted in the same manner as in Example 1.

By a tumbler, 40 parts by weight of the above tableted fire retardant was mixed with 100 parts by weight of polypropylene (D1). The mixture was injection-molded at the nozzle temperature of 200° C., and the cylinder temperature of 200° C. into test pieces of ⅛ inch thick for the UL94 vertical burning test.

The resulting test pieces were tested for the flammability, the particle size of the heat-expandable graphite in the molded test piece, and the strength of the fire retardant tablet in the same manner as in Example 1. The test results are shown in Table 1.

The obtained fire retardant tablets had sufficient strength, and excellent fire-retardancy was achieved without causing crushing of the heat-expandable graphite as shown in Table 1.

COMPARATIVE EXAMPLE 1

The heat-expandable graphite A (A1) alone was tableted in the same manner as in Example 1.

By a tumbler, 40 parts by weight of the above tableted fire retardant was mixed with 100 parts by weight of polypropylene (D1). The mixture was injection-molded at the nozzle temperature of 200° C., and the cylinder temperature of 200° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 1.

The heat-expandable graphite alone could not be tableted, and the fire retardant was not dispersed well in the molded test piece, resulting in poor fire-retardancy as shown in Table 1.

COMPARATIVE EXAMPLES 2–6

The heat-expandable graphite A (A1) and ammonium polyphosphate (B1) were mixed in the fire retardant component ratio shown in Table 2.

100 Parts by weight of the polypropylene (D1) and 40 parts by weight of the fire retardant mixture were melt and kneaded by feeding the resin into the hopper of a co-rotated type twin screw extruder and the fire retardant mixture into the side-feeder thereof at the die temperature of 200° C. and the cylinder temperature of 200° C. to prepare a pelletized fire retardant compound. The pelletized compound was injection-molded at the nozzle temperature of 200° C. and the cylinder temperature of 200° C. into test pieces of ⅛ inch thick for the UL94 vertical burning test in the same manner as in Example 1.

The resulting test pieces were tested for the flammability, and the particle size of the heat-expandable graphite in the molded test piece in the same manner as in Example 1. The test results are shown in Table 2.

Without tableting the fire retardant mixture, the heat-expandable graphite was crushed to result in poor fire retardancy of the molded test piece as shown in Table 2.

EXAMPLES 6–16

The component materials were mixed to obtain the fire retardant tablet composition shown in Table 3. The mixture was tableted in the same manner as in Example 1.

The above tableted fire retardant was mixed with polypropylene (D1) to give the fire-retardant resin composition as shown in Table 3. The mixture was injection-molded at the nozzle temperature of 200° C. and the cylinder temperature of 200° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 3.

The obtained fire retardant tablets had sufficient strength, and excellent fire-retardancy was achieved without causing crushing of the heat-expandable graphite as shown in Table 3.

EXAMPLES 17–21

The component materials were mixed to obtain the fire retardant tablet composition shown in Table 4. The mixture was tableted in the same manner as in Example 1.

The above tableted fire retardant was mixed with polypropylene (D1) to give the fire retardant composition as shown in Table 4. The mixture was injection-molded at the nozzle temperature of 200° C. and the cylinder temperature of 200° C. into test pieces of ⅛ inch thick for the UL94 vertical burning test.

The resulting test pieces were tested for the flammabillity, the particle size of the heat-expandable graphite in the molded test piece, and the strength of the fire retardant tablets in the same manner as in Example 1.

The test results are shown in Table 4. As shown in Table 4, the obtained fire retardant tablets had sufficient strength, and excellent fire-retardancy was achieved without causing crushing of the heat-expandable graphite.

COMPARATIVE EXAMPLES 7–9

The component materials were mixed to obtain the fire retardant tablet composition shown in Table 4. The mixture was tableted in the same manner as in Example 1.

The above tableted fire retardant was mixed with polypropylene (D1) to give the fire retardant composition as shown in Table 4. The mixture was injection-molded at the nozzle temperature of 200° C. and the cylinder temperature of 200° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 4.

Without the water-soluble fire retardant synergist of the component (B), the obtained fire retardant tablets had low tablet strength, and the fire retardant was poorly dispersed in the molded article to result in poor fire retardancy as shown in Table 4.

EXAMPLES 22–25

100 Parts by weight of the heat-expandable graphite B (A2) was mixed with 50 parts by weight of the ammonium polyphosphate (B1). The resulting mixture was tableted in the same manner as in Example 1.

The above tableted fire retardant was mixed with polypropylene (D1) to give the fire retardant composition as shown in Table 5. The mixture was injection-molded at the nozzle temperature of 200° C. and the cylinder temperature of 200° C. into test pieces of ⅛ inch thick and of ¹⁄₁₆ inch for the UL94 vertical combustion test.

The resulting test pieces were tested for the flammability, the particle size of the heat-expandable graphite in the molded test piece, and the strength of the fire retardant tablets in the same manner as in Example 1. The test results are shown in Table 5.

The obtained fire retardant tablets had sufficient strength, and excellent fire-retardancy was achieved without causing crushing of the heat-expandable graphite as shown in Table 5.

COMPARATIVE EXAMPLES 10–14

100 Parts by weight of the heat-expandable graphite B (A1) was mixed with 50 parts by weight of the ammonium polyphosphate (B1) to obtain a fire retardant mixture.

The fire retardant mixture in an amount shown in Table 6 was melt-blended with 100 parts by weight of the polypropylene (D1) by use of a Windsor type twin screw extruder employed in Comparative Example 2 by feeding the resin into the hopper of the extruder and the fire retardant mixture into the side-feeder thereof under the same conditions as in Comparative Example 2 to prepare a pelletized fire retardant compound. The pelletized compound was injection-molded at the nozzle temperature of 200° C. and the cylinder temperature of 200° C. into test pieces of ⅛ inch thick and of ¹⁄₁₆ inch thick for the UL94 vertical burning test in the same manner as in Example 1.

The resulting test pieces were tested for the flammability, and the particle size of the heat-expandable graphite in the molded test piece in the same manner as in Example 1. The test results are shown in Table 6.

Without tableting the fire retardant mixture, the heat-expandable graphite was crushed to result in poor fire retardancy of the molded test piece as shown in Table 2.

EXAMPLES 26 AND 27

100 Parts by weight of the heat-expandable graphite B (A2) was mixed with 50 parts by weight of the ammonium polyphosphate (B1, same as in Example 1). The resulting mixture was tableted in the same manner as in Example 1.

The above tableted fire retardant was mixed with the ethylene-vinyl acetate copolymer resin (D2) to give the fire retardant composition as shown in Table 7. The mixture was injection-molded at the nozzle temperature of 150° C. and the cylinder temperature of 150° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 7.

The obtained fire retardant tablets had sufficient strength, and excellent fire-retardancy was achieved without causing crushing of the heat-expandable graphite as shown in Table 7.

EXAMPLES 28 AND 29

100 Parts by weight of the heat-expandable graphite B (A2) was mixed with 50 parts by weight of the ammonium polyphosphate (B1). The resulting mixture was tableted in the same manner as in Example 1.

The above tableted fire retardant was mixed with the low-density polyethylene (D3) to give the fire retardant composition as shown in Table 7. The mixture was injection-molded at the nozzle temperature of 160° C., and the cylinder temperature of 160° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 7.

The obtained fire retardant tablets had sufficient strength, and excellent fire-retardancy was achieved without causing crushing of the heat-expandable graphite as shown in Table 7.

COMPARATIVE EXAMPLES 15 AND 16

100 Parts by weight of the heat-expandable graphite B (A2) was mixed with 50 parts by weight of the ammonium polyphosphate (B1) to obtain a fire retardant mixture.

The fire retardant mixture in an amount shown in Table 8 was melt-blended with 100 parts by weight of the ethylene-vinyl acetate copolymer resin (D2) by use of the same Windsor type twin screw extruder as the one employed in Comparative Example 2 by feeding the resin into the hopper of the extruder and the fire retardant mixture into the side-feeder thereof at the die temperature of 150° C. and the cylinder temperature of 150° C. to prepare a pelletized fire retardant compound. The pelletized compound was injection-molded at the nozzle temperature of 150° C. and the cylinder temperature of 150° C. into test pieces of ⅛ inch thick for the UL94 vertical burning test.

The resulting test pieces were tested for combustibility, and the particle size of the heat-expandable graphite in the molded test piece in the same manner as in Example 1. The test results are shown in Table 8.

Without tableting the fire retardant mixture, the heat-expandable graphite was crushed to result in poor fire retardancy of the molded test piece as shown in Table 8.

COMPARATIVE EXAMPLES 17 AND 18

100 Parts by weight of the heat-expandable graphite B (A2) was mixed with 50 parts by weight of the ammonium polyphosphate (B1) to obtain a fire retardant mixture.

The fire retardant mixture in an amount shown in Table 8 was melt-blended with 100 parts by weight of the low-density polyethylene (D3) by use of the same Windsor type twin screw extruder as the one employed in Comparative Example 2 by feeding the resin into the hopper of the extruder and the fire retardant mixture into the side-feeder thereof at the die temperature of 160° C. and the cylinder temperature of 160° C. to prepare a pelletized fire retardant compound. The pelletized compound was injection-molded at the nozzle temperature of 160° C. and the cylinder temperature of 160° C. into test pieces of ⅛ inch thick for the UL94 vertical burning test.

The resulting test pieces were tested for the flammability, and the particle size of the heat-expandable graphite in the molded test piece in the same manner as in Example 1. The test results are shown in Table 8.

Without tableting the fire retardant mixture, the heat-expandable graphite was crushed to result in poor fire retardancy of the molded test piece as shown in Table 8.

EXAMPLES 30–33

The component materials for the fire retardant tablets were mixed in amounts shown in Table 9. The mixture was tableted in the same manner as in Example 1.

The above tableted fire retardant was mixed with the ethylene-vinyl acetate copolymer resin (D2) to give the fire retardant composition as shown in Table 9. The mixture was injection-molded at the nozzle temperature of 150° C. and the cylinder temperature of 150° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 9.

The obtained fire retardant tablets had sufficient strength, and excellent fire-retardancy was achieved without causing crushing of the heat-expandable graphite as shown in Table 9.

EXAMPLES 34–37

The source materials for the fire retardant tablets were mixed in amounts shown in Table 9. The mixture was tableted in the same manner as in Example 1.

The above tableted fire retardant was mixed with the low-density polyethylene (D3) to give the fire retardant composition as shown in Table 9. The mixture was injection-molded at the nozzle temperature of 160° C., and the cylinder temperature of 160° C. into test pieces of ⅛ inch thick for the UL94 vertical burning test.

The resulting test pieces were tested for the flammability, the particle size of the heat-expandable graphite in the molded test piece, and the strength of the fire retardant tablets in the same manner as in Example 1. The test results are shown in Table 9.

The obtained fire retardant tablets had sufficient strength, and excellent fire-retardancy was achieved without causing crushing of the heat-expandable graphite as shown in Table 9.

As described above, the fire-retardant polymer composition of the present invention are produced by direct mixing of fire retardant tablet with a resin. The composition or the molded article of the present invention contains the heat-expandable graphite crushed less with less decrease of the particle size, and has excellent fire retardancy in comparison with fire-retardant polymer compositions or the molded articles having the same component composition produced by melt-blending. The amounts of the heat-expandable graphite and the ammonium polyphosphate required for the fire retardancy are less in the present invention.

TABLE 1

|  | Example | | | | | Comparative Example |
|---|---|---|---|---|---|---|
|  | 1 | 2 | 3 | 4 | 5 | 1 |
| Fire retardant tablet Components (weight parts) | | | | | | |
| (A1) Heat-expandable graphite A *1 | 100 | 100 | 100 | 100 | 100 | 100 |
| (B1) Ammonium polyphosphate *2 | 10 | 25 | 33.3 | 50 | 100 | — |
| Fire retardant tablet strength | Good | Good | Good | Good | Good | Poor |
| Fire retardant polymer composition Components (weight by parts) | | | | | | |
| (D1) Polypropylene *3 | 100 | 100 | 100 | 100 | 100 | 100 |
| Fire retardant tablet | 40 | 40 | 40 | 40 | 40 | 40 |
| UL94 vertical combustion test (1/8 inch thick) | V-0 | V-0 | V-0 | V-0 | V-0 | Fail |

TABLE 1-continued

|  | Example | | | | | Comparative Example |
|---|---|---|---|---|---|---|
|  | 1 | 2 | 3 | 4 | 5 | 1 |
| Particle size of heat-expandable graphite in molded article (80-mesh oversize, weight %) | 81 | 80 | 82 | 79 | 80 | 81 |

*1: Produced by Chuou Kasei K.K., 80-mesh oversize: 84% by weight, Change in specific volume by rapid heating from room temperature to 1000° C.: 180 mL/g
*2: HOSTAFLAM AP462, produced by Hoechst Co.
*3: Chisso Polypro K7014, produced by Chisso Corporation

TABLE 2

|  | Comparative Example | | | | |
|---|---|---|---|---|---|
|  | 2 | 3 | 4 | 5 | 6 |
| Fire retardant mixture Components (weight parts) | | | | | |
| (A1) Heat-expandable graphite A *1 | 100 | 100 | 100 | 100 | 100 |
| (B1) Ammonium polyphosphate *2 | 10 | 25 | 33.3 | 50 | 100 |
| Fire retardant polymer composition Components (weight by parts) | | | | | |
| (D1) polypropylene *3 | 100 | 100 | 100 | 100 | 100 |
| Fire retardant mixture | 40 | 40 | 40 | 40 | 40 |
| UL94 vertical combustion test | Fail | Fail | Fail | Fail | Fail |

TABLE 2-continued

|  | Comparative Example | | | | |
|---|---|---|---|---|---|
|  | 2 | 3 | 4 | 5 | 6 |
| (1/8 inch thick) | | | | | |
| Particle size of heat-expandable graphite in molded article (80-mesh oversize, weight %) | 68 | 70 | 66 | 69 | 69 |

*1: Produced by Chuou Kasei K.K., 80-mesh oversize: 84% by weight, Change in specific volume by rapid heating from room temperature to 1000° C.: 180 mL/g
*2: HOSTAFLAM AP462, produced by Hoechst Co.
*3: Chisso Polypro K7014, produced by Chisso Corporation

TABLE 3

|  | Example | | | | | | | | | | |
|---|---|---|---|---|---|---|---|---|---|---|---|
|  | 6 | 7 | 8 | 9 | 10 | 11 | 12 | 13 | 14 | 15 | 16 |
| Fire retardant tablet Components (parts by weight) | | | | | | | | | | | |
| (A1) Heat-expandable graphite A *1 | 100 | 100 | 100 | 100 | 100 | 100 | 100 | 100 | 100 | 100 | 100 |
| (B1) Ammonium polyphosphate *2 | — | — | — | 20 | 10 | 1 | 0.4 | 10 | — | — | — |
| (B2) Phosphorus compound A *3 | 50 | — | — | — | — | — | — | — | 10 | — | — |
| (B3) Magnesium oxide *4 | — | 50 | — | — | — | — | — | — | — | 10 | — |
| (B4) Magnesium hydroxide *5 | — | — | 50 | — | — | — | — | — | — | — | 10 |
| (C1) Antimony trioxide *6 | — | — | — | 30 | 40 | 49 | 49.6 | — | 40 | 40 | 40 |
| (C2) Zinc borate *7 | — | — | — | — | — | — | — | 40 | — | — | — |
| Fire retardant tablet strength | Good | Good | Good | Good | Good | Good | Fair | Good | Good | Good | Good |
| Fire retardant polymer composition Components (parts by weight) | | | | | | | | | | | |
| (D1) Polypropylene *8 | 100 | 100 | 100 | 100 | 100 | 100 | 100 | 100 | 100 | 100 | 100 |
| Fire retardant tablet | 40 | 50 | 50 | 40 | 40 | 40 | 40 | 40 | 40 | 50 | 50 |
| UL94 vertical combustion test (1/8 inch thick) | V-0 | V-0 | V-0 | V-0 | V-0 | V-0 | V-2 | V-0 | V-0 | V-0 | V-0 |
| Particle size of heat-expandable graphite in molded article (80-mesh oversize, weight %) | 81 | 82 | 79 | 83 | 81 | 80 | 80 | 79 | 80 | 78 | 82 |

*1: Produced by Chuou Kasei K.K., 80-mesh oversize: 84% by weight, Change in specific volume by rapid heating from room temperature to 1000° C.: 180 mL/g
*2: HOSTAFLAM AP462, produced by Hoechst Co.
*3: FYROL 51, produced by Akuzo-Kashima K.K., addition reaction product of dimethyl methylphosphonate, ethylene oxide, and phosphorus pentoxide
*4: Kyowa Mag 150, produced by Kyowa Kagaku Kogyo K.K.
*5: Magnesium Hydroxide 200, produced by Kamishima Kagaku K.K.
*6: Flame Cut 610R, produced by Tosoh Corporation
*7: Zinc Borate 2335, produced by Tomita Seiyaku K.K.
*8: Chisso Polypro K7014, produced by Chisso Corporation

TABLE 4

|  | Example | | | | | Comparative Example | | |
|---|---|---|---|---|---|---|---|---|
|  | 17 | 18 | 19 | 20 | 21 | 7 | 8 | 9 |
| Fire retardant tablet Components (parts by weight) | | | | | | | | |
| (A1) Heat-expandable graphite A *1 | 100 | 100 | 100 | 100 | 100 | 100 | 100 | 100 |
| (B1) Ammonium polyphosphate *2 | 10 | 10 | 10 | 10 | 10 | — | — | — |
| (C1) Antimony trioxide *3 | — | — | — | — | — | 50 | — | — |
| (C3) Red phosphorus *4 | 40 | — | — | — | — | — | 50 | — |
| (C4) Phosphorus compound B *5 | — | 40 | — | — | — | — | — | — |
| (C5) Phosphorus compound C *6 | — | — | 40 | — | — | — | — | — |
| (C6) Phosphorus compound D *7 | — | — | — | 40 | — | — | — | 50 |
| (C7) Phosphorus compound E *8 | — | — | — | — | 40 | — | — | — |
| Fire retardant tablet strength | Good | Good | Good | Good | Good | Poor | Poor | Poor |
| Fire retardant polymer composition Components (parts by weight) | | | | | | | | |
| (D1) Polypropylene *9 | 100 | 100 | 100 | 100 | 100 | 100 | 100 | 100 |
| Fire retardant tablet | 20 | 40 | 40 | 40 | 40 | 40 | 20 | 40 |
| UL94 vertical combustion test (1/8 inch thick) | V-0 | V-0 | V-0 | V-0 | V-0 | Fail | V-2 | Fail |
| Particle size of heat-expandable graphite in molded article (80-mesh oversize, weight %) | 85 | 78 | 82 | 79 | 83 | 81 | 83 | 79 |

*1: Produced by Chuou Kasei K.K., 80-mesh oversize: 84% by weight, Change in specific volume by rapid heating from room temperature to 1000° C.: 180 mL/g
*2: HOSTAFLAM AP462, produced by Hoechst Co.
*3: Flame Cut 610R produced by Tosoh Corporation
*4: Flame Cut Novared 120 produced by Tosoh Corporation
*5: Cresol-condensation type phosphate ester, PX-200, produced by Daihachi Kagaku Kogyo K.K.
*6: Bisphenol A-skeleton phosphate ester: Phosflex 580, produced by Akuzo-Kashima K.K.
*7: 9,10-dihydro-9-oxa-10-phosphanusphenanthrene-10-oxide, HIRETAR 101, produced by Kohlon Co.
*8: Triphenyl phosphate, Phosflex TPP, produced by Akuzo-Kashima K.K.
*9: Chisso Polypro K7014, produced by Chisso Corporation

TABLE 5

|  | Example | | | |
|---|---|---|---|---|
|  | 22 | 23 | 24 | 25 |
| Fire retardant tablet Components (weight parts) | | | | |
| (A2) Heat-expandable graphite B *1 | 100 | 100 | 100 | 100 |
| (B1) Ammonium polyphosphate *2 | 50 | 50 | 50 | 50 |
| Fire retardant tablet strength | Good | Good | Good | Good |
| Fire retardant polymer composition Components (weight by parts) | | | | |
| Polypropylene *3 | 100 | 100 | 100 | 100 |
| Fire retardant tablet | 20 | 30 | 40 | 60 |
| UL94 vertical combustion test (1/8 inch thick) | V-2 | V-0 | V-0 | V-0 |
| UL94 vertical combustion test (1/16 inch thick) | Fail | Fail | V-2 | V-0 |
| Particle size of heat-expandable graphite in molded article (80-mesh oversize, weight %) | 93 | 90 | 85 | 84 |

*1: Produced by Chuou Kasei K.K., 80-mesh oversize: 96% by weight, Change in specific volume by rapid heating from room temperature to 1000° C.: 200 mL/g
*2: HOSTAFLAM AP462, produced by Hoechst Co.
*3: Chisso Polypro K7014, produced by Chisso Corporation

TABLE 6

|  | Comparative Example | | | | |
|---|---|---|---|---|---|
|  | 10 | 11 | 12 | 13 | 14 |
| Fire retardant tablet Components (weight parts) | | | | | |
| (A2) Heat-expandable graphite B *1 | 100 | 100 | 100 | 100 | 100 |
| (B1) Ammonium polyphosphate *2 | 50 | 50 | 50 | 50 | 50 |
| Fire retardant polymer composition Components (weight by parts) | | | | | |
| (D1) Polypropylene *3 | 100 | 100 | 100 | 100 | 100 |
| Fire retardant mixture | 20 | 30 | 40 | 60 | 80 |
| UL94 vertical combustion test (1/8 inch thick) | Fail | Fail | Fail | V-2 | V-0 |
| UL94 vertical combustion test (1/16 inch thick) | Fail | Fail | Fail | Fail | Fail |
| Particle size of heat-expandable graphite in molded article (80-mesh oversize, weight %) | 80 | 75 | 66 | 57 | 50 |

*1: Produced by Chuou Kasei K.K., 80-mesh oversize: 96% by weight, Change in specific volume by rapid heating from room temperature to 1000° C.: 200 mL/g
*2: HOSTAFLAM AP462, produced by Hoechst Co.
*3: Chisso Polypro K7014, produced by Chisso Corporation

TABLE 7

| | Example | | | |
|---|---|---|---|---|
| | 26 | 27 | 28 | 29 |
| Fire retardant tablet Components (weight parts) | | | | |
| (A2) Heat-expandable graphite B *1 | 100 | 100 | 100 | 100 |
| (B1) Ammoniun polyphosphate *2 | 50 | 50 | 50 | 50 |
| Fire retardant tablet strength | Good | Good | Good | Good |
| Fire retardant polymer composition Components (weight by parts) | | | | |
| (D2) Ethylene-vinyl acetate copolymer *3 | 100 | 100 | — | — |
| (D3) Low-density polyethylene *4 | — | — | 100 | 100 |
| Fire retardant tablet | 10 | 20 | 20 | 30 |
| UL94 vertical combustion test (1/8 inch thick) | V-0 | V-0 | V-0 | V-0 |
| Particle size of heat-expandable graphite in molded article (80-mesh oversize, weight %) | 94 | 90 | 91 | 85 |

*1: Produced by Chuou Kasei K.K., 80-mesh oversize: 96% by weight, Change in specific volume by rapid heating from room temperature to 1000° C.: 200 mL/g
*2: HOSTAFLAM AP462, produced by Hoechst Co.
*3: Ultrathene 630, produced by Tosoh Corporation
*4: Petrothene 203, produced by Tosoh Corporation

TABLE 8

| | Comparative Example | | | |
|---|---|---|---|---|
| | 15 | 16 | 17 | 18 |
| Fire retardant tablet Components (weight parts) | | | | |
| (A2) Heat-expandable graphite B *1 | 100 | 100 | 100 | 100 |
| (B1) Ammonium polyphosphate *2 | 50 | 50 | 50 | 50 |
| Fire retardant polymer composition Components (weight by parts) | | | | |
| (D2) Ethylene-vinyl acetate copolymer *3 | 100 | 100 | — | — |
| (D3) Low-density polyethylene *4 | — | — | 100 | 100 |
| Fire retardant mixture | 10 | 20 | 20 | 30 |
| UL94 vertical combustion test (1/8 inch thick) | Fail | V-2 | Fail | V-1 |
| Particle size of heat-expandable graphite in molded article (80-mesh oversize, weight %) | 82 | 80 | 81 | 76 |

*1: Produced by Chuou Kasei K.K., 80-mesh oversize: 96% by weight, Change in specific volume by rapid heating from room temperature to 1000° C.: 200 mL/g
*2: HOSTAFLAM AP462, produced by Hoechst Co.
*3: Ultrathene 630, produced by Tosoh Corporation
*4: Petrothene 203, produced by Tosoh Corporation

TABLE 9

| | Example | | | | | | | |
|---|---|---|---|---|---|---|---|---|
| | 30 | 31 | 32 | 33 | 34 | 35 | 36 | 37 |
| Fire retardant tablet Components (parts by weight) | | | | | | | | |
| (A2) Heat-expandable graphite B *1 | 100 | 100 | 100 | 100 | 100 | 100 | 100 | 100 |
| (B1) Ammonium polyphosphate *2 | 10 | 10 | — | — | 10 | 10 | — | — |
| (B3) Magnesium oxide *3 | — | — | 50 | 50 | — | — | 50 | 50 |
| (C1) Antimony trioxide *4 | 40 | 40 | — | — | 40 | 40 | — | — |
| Fire retardant tablet strength | Good | Good | Good | Good | Good | Good | Good | Good |
| Fire retardant polymer composition Components (parts by weight) | | | | | | | | |
| (D2) Ethylene-vinyl acetate copolymer *5 | 100 | 100 | 100 | 100 | — | — | — | — |
| (D3) Low-density polyethylene *6 | — | — | — | — | 100 | 100 | 100 | 100 |
| Fire retardant tablet | 10 | 20 | 10 | 20 | 20 | 30 | 20 | 30 |
| UL94 vertical combustion test (1/8 inch thick) | V-0 | V-0 | V-0 | V-0 | V-0 | V-0 | V-0 | V-0 |

TABLE 9-continued

| | Example | | | | | | | |
|---|---|---|---|---|---|---|---|---|
| | 30 | 31 | 32 | 33 | 34 | 35 | 36 | 37 |
| Particle size of heat-expandable graphite in molded article (80-mesh oversize, weight %) | 81 | 80 | 90 | 87 | 91 | 86 | 92 | 89 |

*1: Produced by Chuou Kasei K.K., 80-mesh oversize: 96% by weight, Change in specific volume by rapid heating from room temperature to 1000° C.: 200 mL/g
*2: HOSTAFLAM AP462, produced by Hoechst Co.
*3: Kyowa Mag 150, produced by Kyowa Kagaku Kogyo K.K.
*4: Flame Cut 610R, produced by Tosoh Corporation
*5: Ultrathene 630, produced by Tosoh Corporation
*6: Petrothene 203, produced by Tosoh Corporation

What is claimed is:

1. A fire retardant tablet produced by tableting a fire retardant mixture consisting essentially of heat-expandable graphite (A) and a water-soluble fire retardant synergist (B), wherein the water-soluble fire retardant synergist (B) is used in an amount of from not less than one part by weight to 100 parts by weight per 100 parts by weight of the heat-expandable graphite (A), and wherein the water-soluble fire retardant synergist (B) has a solubility in water of not lower than 0.5 mg/100 g.

2. The tableted fire retardant according to claim 1, produced by tableting a fire retardant mixture containing at least one part by weight of the water-soluble fire retardant synergist (B) per 100 parts by weight of the heat-expandable graphite (A).

3. The tableted fire retardant according to claim 1, wherein the water-soluble fire retardant synergist (B) is one or more selected from the group consisting of water-soluble phosphorus compounds, metal oxides, and metal hydroxides.

4. The tableted fire retardant according to claim 3, wherein the water-soluble fire retardant synergist (B) is one or more selected from the group consisting of ammonium polyphosphate; addition reaction products of dimethyl methylphosphonate, ethylene oxide, and phosphorus pentaoxide; magnesium oxide; and magnesium hydroxide.

5. The tableted fire retardant according to claim 4, wherein the water-soluble fire retardant synergist (B) is ammonium polyphosphate.

6. A method of fire retardation, comprising blending 5 to 60 parts by weight of the tableted fire retardant set forth in claim 1 with 100 parts by weight of a resin.

7. A fire-retardant polymer composition, produced by blending 5 to 60 parts by weight of the tableted fire retardant set forth in claim 1 with 100 parts by weight of a resin.

8. A fire retardant molded article, produced by molding the fire-retardant polymer composition set forth in claim 7.

9. A fire retardant tablet produced by tableting a fire retardant mixture consisting essentially of heat-expandable graphite (A), a water-soluble fire retardant synergist (B), and a water-insoluble fire retardant synergist (C), wherein the water-soluble fire-retardant synergist (B) is used in an amount of from not less than one part by weight to 100 parts by weight per 100 parts by weight of the heat-expandable graphite (A), and wherein the water-soluble fire retardant synergist (B) has a solubility in water of not lower than 0.5 mg/100 g, and wherein the water-insoluble fire retardant synergist (C) has a solubility in water of lower than 0.5 mg/100 g.

10. The tableted fire retardant according to claim 9, produced by tableting a fire retardant mixture containing at least one part by weight of the water-soluble fire retardant synergist (B) per 100 parts by weight of the heat-expandable graphite (A).

11. The tableted fire retardant according to claim 9, wherein the water-soluble fire retardant synergist (B) is one or more selected from the group consisting of water-soluble phosphorus compounds, metal oxides, and metal hydroxides.

12. The tableted fire retardant according to claim 11, wherein the water-soluble fire retardant synergist (B) is one or more selected from the group consisting of ammonium polyphosphate; additional reaction products of dimethyl methylphosphonate, ethylene oxide, and phosphorus pentaoxide; magnesium oxide; and magnesium hydroxide.

13. The tableted fire retardant according to claim 12, wherein the water-soluble fire retardant synergist (B) is ammonium polyphosphate.

14. A method of fire retardation, comprising blending 5 to 60 parts by weight of the tableted fire retardant set forth in claim 7 with 100 parts by weight of a resin.

15. A method of fire retardation, comprising blending 5 to 60 parts by weight of the tableted fire retardant set forth in claim 8 with 100 parts by weight of a resin.

16. A method of fire retardation, comprising blending 5 to 60 parts by weight of the tableted fire retardant set forth in claim 9 with 100 parts by weight of a resin.

17. A fire-retardant polymer composition, produced by blending 5 to 60 parts by weight of the tableted fire retardant set forth in claim 7 with 100 parts by weight of a resin.

18. A fire-retardant polymer composition, produced by blending 5 to 60 parts by weight of the tableted fire retardant set forth in claim 8 with 100 parts by weight of a resin.

19. A fire-retardant polymer composition, produced by blending 5 to 60 parts by weight of the tableted fire retardant set forth in claim 9 with 100 parts by weight of a resin.

20. A fire retardant molded article, produced by molding the fire-retardant polymer composition set forth in claim 17.

21. A fire retardant molded article, produced by molding the fire-retardant polymer composition set forth in claim 18.

22. A fire retardant molded article, produced by molding the fire-retardant polymer composition set forth in claim 19.

23. The tableted fire retardant according to claim 9, wherein the ratio of the water-soluble fire retardant synergist (B) to the water-insoluble fire retardant synergist is as below:

$$(B)/(C) \geq 1/99 \text{ (by weight)}.$$

24. The tableted fire retardant according to claim 9, wherein the water-insoluble fire retardant synergist (C) is one or more selected from red phosphorus, water-insoluble phosphorus compounds, metal oxides and metal hydroxides.

25. The tableted fire retardant according to claim 24, wherein the water-insoluble fire retardant synergist (C) is one or more selected from red phosphorus, phosphorus compounds represented by the formulas (1)–(4) below:

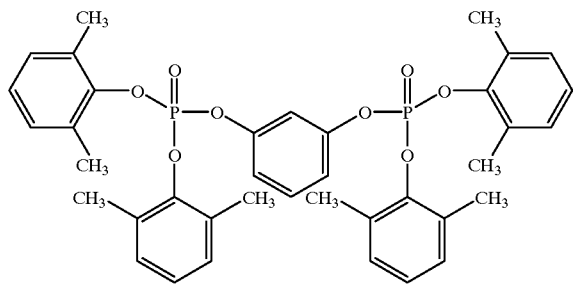
(1)
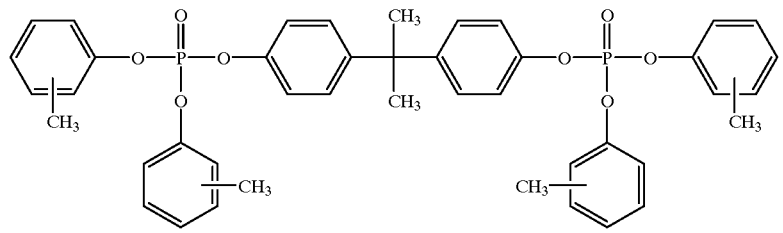
(2)
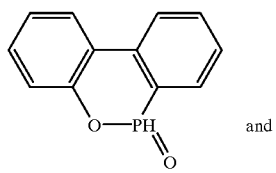 and
(3)
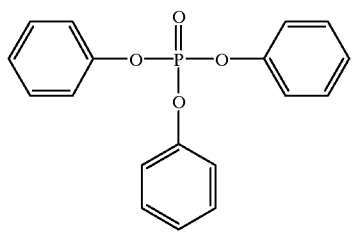
(4)
antimony trioxide, zinc borate, and aluminum hydroxide.
* * * * *